(12) United States Patent
Ham et al.

(10) Patent No.: US 7,336,971 B2
(45) Date of Patent: Feb. 26, 2008

(54) SYSTEM FOR PROVIDING PRIVATE MOBILE COMMUNICATION SERVICE SEPARATELY FROM PUBLIC MOBILE COMMUNICATION NETWORK AND METHOD OF PROCESSING CALL USING THE SAME

(75) Inventors: Young-Cheol Ham, Suwon (KR); Gui-Jung Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 535 days.

(21) Appl. No.: 10/765,422

(22) Filed: Jan. 28, 2004

(65) Prior Publication Data

US 2004/0185880 A1 Sep. 23, 2004

(30) Foreign Application Priority Data

Jan. 30, 2003 (KR) ...................... 10-2003-0006150

(51) Int. Cl.
*H04M 1/00* (2006.01)
(52) U.S. Cl. ................................. 455/552.1; 455/554.2
(58) Field of Classification Search ............. 455/554.1, 455/555, 433, 436, 415, 432.1, 432.3, 435.2, 455/439, 442, 435.1, 454, 437, 464–465, 455/461, 33.2, 552, 552.1, 422.1, 33.1, 206, 455/33.4, 422, 443; 379/225; 370/335, 370/331
See application file for complete search history.

(56) References Cited

U.S. PATENT DOCUMENTS 5,406,615 A * 4/1995 Miller et al. ............. 455/552.1
6,529,491 B1 * 3/2003 Chang et al. ............... 370/335
6,539,237 B1 3/2003 Sayers et al.
6,970,719 B1 * 11/2005 McConnell et al. ..... 455/554.1

FOREIGN PATENT DOCUMENTS

| JP | 08-237742 | 9/1996 |
| JP | 10-336728 | 12/1998 |
| JP | 09-093329 | 4/1999 |
| JP | 11-262064 | 9/1999 |
| JP | 2000-197127 | 7/2000 |
| JP | 2001-025066 | 1/2001 |
| KR | 10-2001-0107028 | 12/2000 |

* cited by examiner

*Primary Examiner*—Tu Nguyen
(74) *Attorney, Agent, or Firm*—Robert E. Bushnell, Esq.

(57) ABSTRACT

A system for providing a private mobile communication service separately from a public mobile communication network and method of processing a call using the same. The system includes a mobile station for establishing a radio communication channel with a private BTS (pBTS) when it moves from a public-only cell to a public/private common cell; and establishes a traffic channel with the pBTS if an identifier is added to a dialed number, and establishes a traffic channel with a public BTS if the identifier is not added. A private communication service apparatus determines, if a traffic channel request is received from the mobile station, whether the mobile station is a subscriber to the private mobile communication service, establishing a radio communication channel if the mobile station is a subscriber, and establishing a traffic channel over a private network and a public switched telephone network.

14 Claims, 6 Drawing Sheets

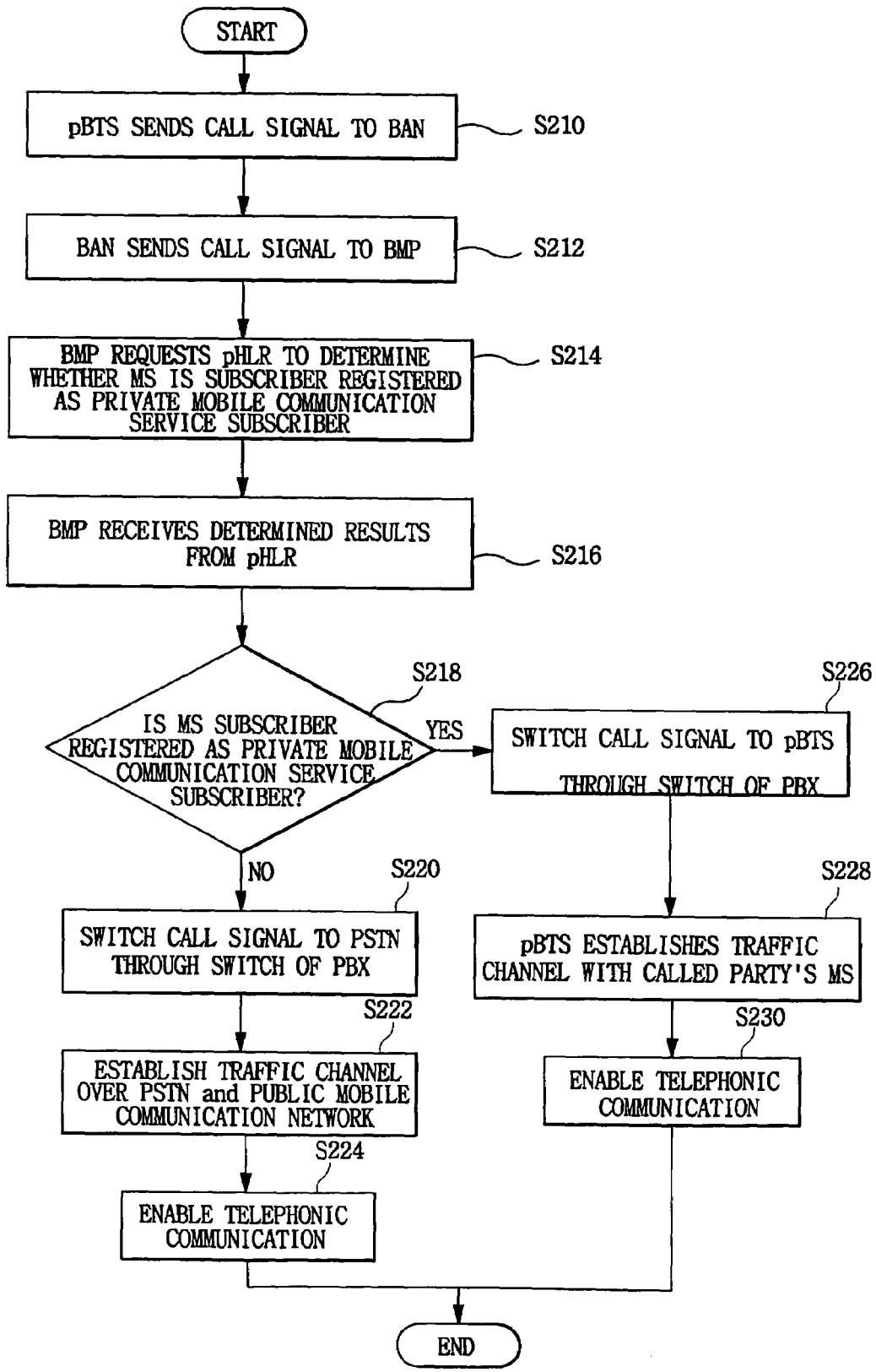

SYSTEM FOR PROVIDING PRIVATE MOBILE COMMUNICATION SERVICE SEPARATELY FROM PUBLIC MOBILE COMMUNICATION NETWORK AND METHOD OF PROCESSING CALL USING THE SAME

CLAIM OF PRIORITY

This application makes reference to and claims all benefits accruing under 35 U.S.C. §119 from an application for "SYSTEM FOR PROVIDING PRIVATE MOBILE COMMUNICATION SERVICE SEPARATELY FROM PUBLIC MOBILE COMMUNICATION NETWORK AND METHOD OF PROCESSING CALL USING THE SAME" earlier filed in the Korean Intellectual Property Office on 30 Jan. 2003 and thereby duly assigned Serial No. 2003-6150.

BACKGROUND OF THE INVENTION

1. Field of the Invention

The present invention relates generally to a system for providing a private mobile communication service and method of processing a call using the same, and more particularly to a system for providing a private mobile communication service separately from a public mobile communication network and method of processing a call using the same, which can provide the private mobile communication service without being connected and related to a system for providing a public mobile communication service.

2. Description of the Related Art

Generally, a private wired communication service for voice within a local area is provided through a private branch exchange (or key phone system), and a communication service for data within a local area is provided through a Local Area Network (LAN) switch using a server and a router.

Further, generally, a mobile communication service can be provided anywhere beyond a limited area, such as a local area. However, such a mobile communication service is provided using a mobile communication service system, and is not constructed to allow wireless communication to be performed without charge within a specific area.

That is, in order for a terminal of a wired private branch exchange and a mobile terminal of a subscriber to the mobile communication service to communicate with each other, a corresponding one terminal is connected to a public network through an exchange thereof, and a call from the terminal is linked to the other.

In this case, the public network includes a mobile communication network and a public switched telephone network. Therefore, there is an inconvenience in that, even though a wired communication service subscriber and a mobile communication service subscriber communicate with each other by phone within the same building, a fee is charged for the call.

Therefore, a system for providing a private mobile communication service that enables telephonic communication without charge in the case where a wired communication service subscriber and a mobile communication service subscriber call within the same specific area (for example, building, etc.) has been proposed. Such a system has been discussed in Korean Pat. Appl. No. 2000-28172. In this case, a mobile communication service system is designated as a public mobile communication service system to be differentiated from a private mobile communication service system. Further, a private wired communication service and a private mobile communication service are collectively designated as a private network.

The private mobile communication service system enables a mobile communication service subscriber registered for the private mobile communication service to be provided with a call service between the subscriber and another subscriber registered for the private mobile communication service or a subscriber of an extension telephone connected to a private branch exchange, without charge within an area in which the private mobile communication service is provided.

However, since the private mobile communication service system is positioned between base station controllers and base transceiver stations of a higher public mobile communication network in the prior art, it is subordinate to the higher public mobile communication network. Therefore, the conventional system is problematic in that the private mobile communication service system can be linked to only a public mobile communication network of a specific company supporting the private mobile communication service system.

Further, the conventional system is problematic in that, since a private base station controller of the private mobile communication service system is constructed to be linked to the base station controller of the higher public mobile communication network, all messages to be sent to or received from the private base transceiver station of the private mobile communication network must be routed to the public mobile communication network or the private mobile communication network, thus increasing a load of the private mobile communication service system.

Further, the conventional system is problematic in that, since a conventional base transceiver stations environment must be completely excluded in the case where the private mobile communication service system constructs a wireless environment, it is difficult to construct a wireless environment.

Incorporated by reference herein is U.S. Pat. No. 6,539,237 to Ian Leslie Syaers et al. entitled "Method and Apparatus for Integrated Wireless Communications in Private and Public Network Environments" that provides for wireless calls in private network environments and in public network environments. More particularly, this patent relates to communication systems that interconnect wireless networks with private networks where the private networks typically are corporate networks that connect to public networks such as PSTN, ISDN and the Internet.

SUMMARY OF THE INVENTION

Accordingly, the present invention has been made keeping in mind the above problems occurring in the prior art, and an object of the present invention is to provide a system for providing a private mobile communication service separately from a public mobile communication network and method of processing a call using the same, which can provide a wireless local network function without being subordinate to a conventional public mobile communication service system.

Another object of the present invention is to provide a system for providing a private mobile communication service separately from a public mobile communication network and method of processing a call using the same, which can provide a wireless local network function without being influenced by a wireless environment of a conventional public mobile communication service system.

In order to accomplish the above object, the present invention provides a system for providing a private mobile communication service, comprising a private base transceiver station for providing a wireless environment to provide a private mobile communication service; a first mobile station for establishing a radio communication channel with the private base transceiver station when the first mobile station moves from a public-only cell area to a public/private common cell area, determining whether an identifier indicating a request for the private mobile communication service is added to a user's desired phone number if the phone number is entered by the user, establishing a traffic channel with the private base transceiver station if the identifier is added to the phone number, and establishing a traffic channel with a public base transceiver station if the identifier is not added to the phone number; and a private communication service apparatus for verifying whether the first mobile station is a subscriber to the private mobile communication service if a request for establishing a radio communication channel is received from the first mobile station, establishing a radio communication channel if the first mobile station is the service subscriber, and establishing a traffic channel over a private network and a public switched telephone network if a traffic channel request is received from the first mobile station with which the radio communication channel is established.

Further, the present invention provides a method of processing a call using a private mobile communication service system, comprising the steps of a) establishing a radio communication channel with the private mobile communication service system if a mobile station moves from a public-only cell area to a public/private common cell area; b) determining whether an identifier indicating a request for a private mobile communication service is added to a phone number when the user makes a request for a call by entering the phone number; c) establishing a traffic channel with a public mobile communication service system if the identifier is not added to the phone number at step b), while establishing a traffic channel with the private mobile communication service system if the identifier is added to the phone number; and d) establishing a traffic channel over a wired local network, a private mobile communication network and a public switched telephone network by the private mobile communication service system if a request for establishment of a traffic channel is received from the mobile station.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a flowchart of a method of processing a call from one MS to another MS located in a public/private common cell area according to an embodiment of the present invention.

DESCRIPTION OF THE PREFERRED EMBODIMENTS

Figure 1:
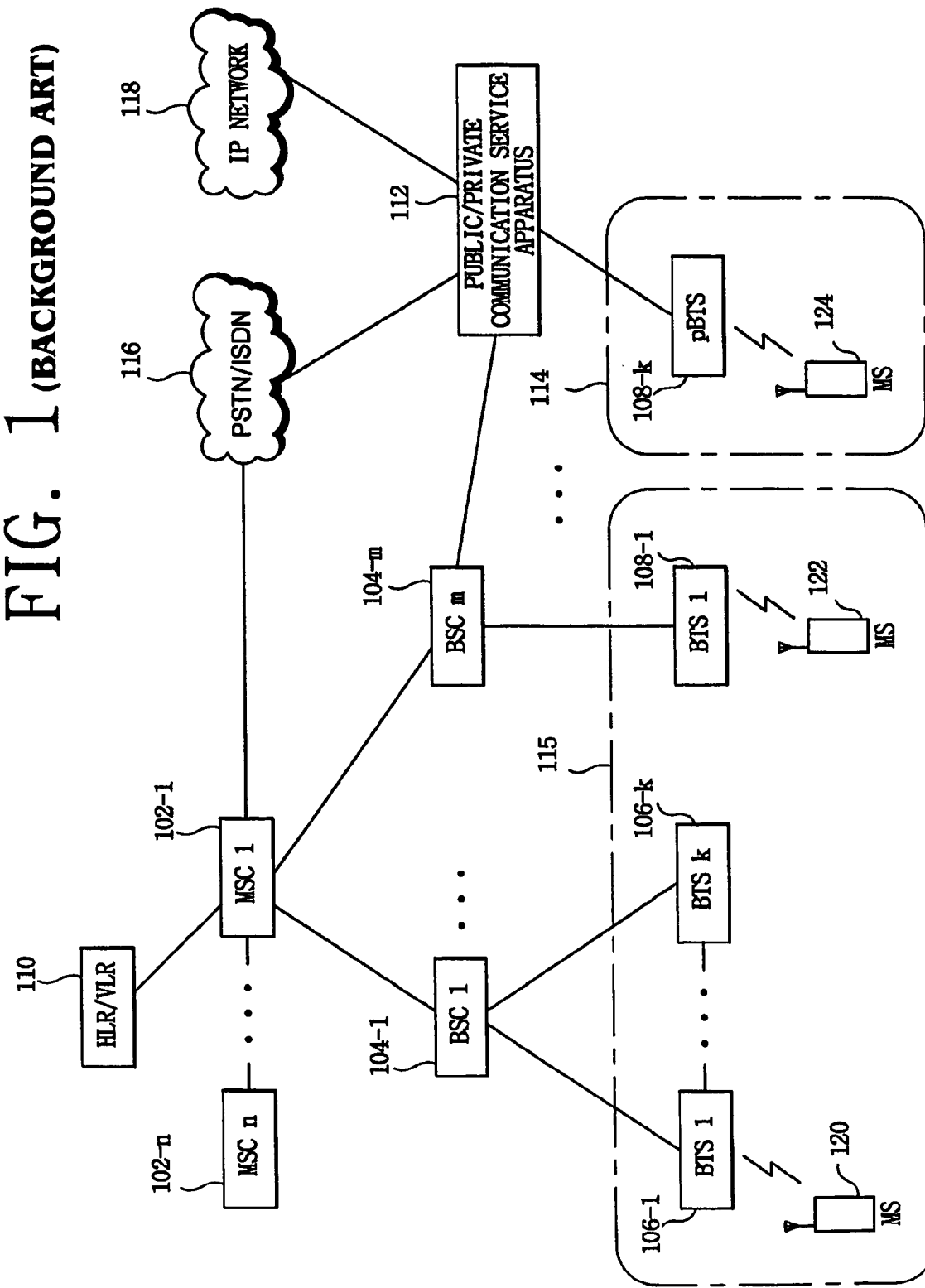
FIG. 1 is a view of a network structure illustrating a concept of exemplary public and private mobile communication services.

Reference now should be made to the drawings, in which the same reference numerals are used throughout the different drawings to designate the same or similar components.

FIG. 1 is a view of a network structure illustrating a concept of exemplary public and private mobile communication services.

In order to provide both the public and private mobile communication services, a service system includes a public/private common cell area 114, which is a common service area shared between public and private communication services, and a public/private communication service apparatus 112, as shown in FIG. 1.

In order to differentiate Base Station Transceivers (BTSs) belonging to a public mobile communication service system 115, that is, BTSs 106-1 to 106-k, and 108-1 shown in FIG. 1 as examples, from a private BTS 108-k belonging to the public/private common cell area 114, the private BTS 108-k is designated as a pBTS.

The pBTS 108-k functions to establish a radio communication channel with a mobile station (MS) 124 belonging to the public/private common cell area 114, and manage radio resources. Further, the pBTS 108-k is connected to a Base Station Controller (BSC) of the public mobile communication service system, for example, a BSC 104-m shown in FIG. 1, through the public/private communication service apparatus 112.

The public/private communication service apparatus 112 is connected to the BSC 104-m of the public mobile communication service system, a Public Switched Telephone Network (PSTN)/Integrated Services Digital Network (ISDN) 116, and an Internet Protocol (IP) network 118. The public/private communication service apparatus 112 provides a mobile communication service so that public and private mobile communication services are selectively provided to MSs in the public/private common cell area 114, for example, the MS 124 of FIG. 1.

If the MS 124 is registered in the public/private communication service apparatus 112 to be capable of being provided with the private mobile communication service, the MS 124 can be provided with the private mobile communication service as well as the public mobile communication service.

However, if the MS 124 is not registered in the public/private communication service apparatus 112 to be provided with the private mobile communication service, the MS 124 can be provided with only the public mobile communication service. Further, the public/private communication service apparatus 112 also provides a wired communication service with the PSTN/ISDN 116 and the IP network 118.

Figure 2:
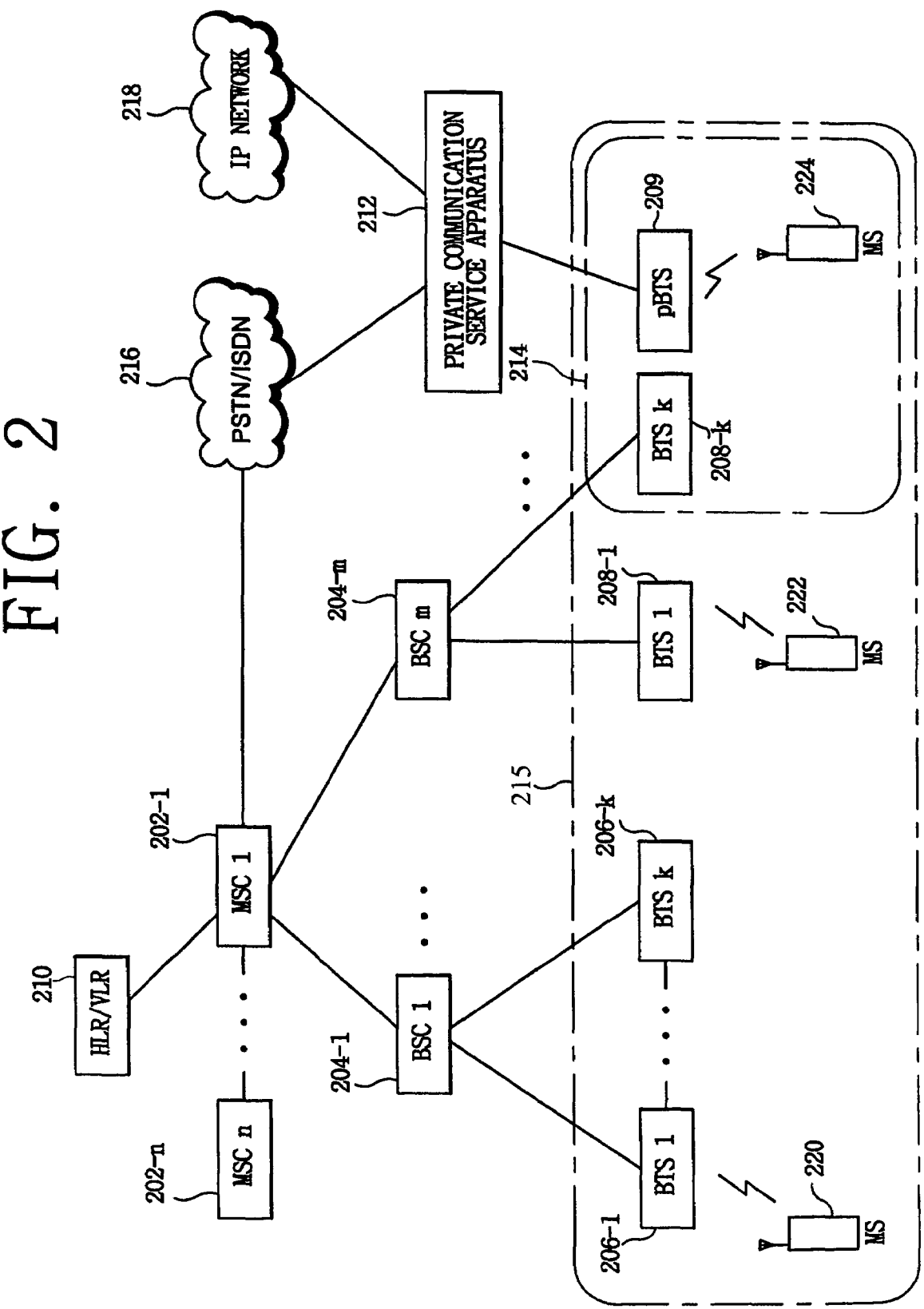
FIG. 2 is a view of a network structure illustrating a concept of a system for providing a private mobile communication service according to an embodiment of the present invention.

FIG. 2 is a view of a network structure illustrating a concept of a system for providing a private mobile communication service, according to an embodiment of the present invention.

As shown in FIG. 2, in the embodiment of the present invention, the private mobile communication service system includes a public/private common cell area 214, which is a common service area shared between public and private communication services so as to provide both public and private mobile communication services. The service system further includes a public Base Station Controller (BSC) 204-m, and a private communication service apparatus 212.

The public/private common cell area 214 includes a public Base Transceiver Station (BTS) 208-k, so as to provide a public mobile communication service, and a private BTS (pBTS) 209 so as to provide a private mobile communication service.

Preferably, the public/private common cell area 214 is determined to be suitable to provide a convenient communication service to a specific group. For example, if a specific company uses one building, an area including the building can be defined as the public/private common cell area 214.

In the prior art, an agreement with a public mobile communication service provider must be made in advance to define a public/private common cell area. However, in the present invention, since public and private mobile communication services are not linked to each other, an agreement with a public mobile communication service provider is not required any longer.

The pBTS 209 functions to establish a radio communication channel if an MS 224, belonging to the public/private common cell area 214 and registered in the private communication service apparatus 212 to use the private mobile communication service, requests the pBTS 209 to establish the radio communication channel, and to manage radio resources. Further, the pBTS 209 enables the MS 224 to be provided with a call service between the MS 224 and another mobile communication subscriber registered in the private communication service apparatus 212 to use the private mobile communication service, or an extension telephone subscriber. In this case, a private wired communication service (local extension telephone subscriber) and a private mobile communication service are collectively designated as a private communication service.

That is, if the MS 224, registered in the private communication service apparatus 212 to use the private mobile communication service, requests the pBTS 209 to establish a radio communication channel, the pBTS 209 establishes the radio communication channel to enable telephonic communication.

On the other hand, if an MS 224, not registered in the private communication service apparatus 212 to use the private mobile communication service, requests the pBTS 209 to establish a radio communication channel, the pBTS 209 transmits a rejection signal for the establishment of a radio communication channel to the MS 224 to prohibit the MS 224 from using the private mobile communication service.

The private communication service apparatus 212 is connected to both the PSTN/ISDN 216 and the IP network 218. The private communication service apparatus 212 provides a mobile communication service so that the private mobile communication service can be provided to MSs included in the public/private common cell area 214 and registered to use the private mobile communication service, for example, the MS 224 of FIG. 2.

That is, if the MS 224 is registered in the private communication service apparatus 212 to be capable of using the private mobile communication service, the private communication service apparatus 212 provides the private mobile communication service to the MS 224 through the pBTS 209.

Further, if the MS 224 is not registered in the private communication service apparatus 212 to be capable of using the private mobile communication service, the private communication service apparatus 212 intercepts the access of the MS 224 by transmitting a rejection signal for the establishment of a radio communication channel to the MS 224 in the case where the MS 224 requests the private communication service apparatus 212 to establish the radio communication channel through the pBTS 209, thus prohibiting the MS 224 from being provided with the private mobile communication service.

Further, the private communication service apparatus 212 also provides a wired communication service with both the PSTN/ISDN 216 and the IP network 218. For example, if the MS 224 belonging to the public/private common cell area 214 needs to communicate with an MS, not belonging thereto, the private communication service apparatus 212 accesses the public mobile communication network through the PSTN 216 and establishes a communication channel with the MS, not belonging to the public/private common cell area 214, thus enabling communication between the MSs.

Moreover, if the MS 224 belonging to the public/private common cell area 214 needs to call a public network subscriber, not an extension telephone subscriber, the private communication service apparatus 212 establishes a communication channel with the public network subscriber through the PSTN 216, thus enabling communication between the MS 224 and the public network subscriber.

In the meantime, the public mobile communication network is typically designated as a Public Land Mobile Network (PLMN). As shown in FIG. 2, a public mobile communication system according to an embodiment includes a plurality of Mobile Switching Centers (MSCs) 202-1 to 202-n, a plurality of Base Station Controller (BSCs) 204-1 to 204-m, a plurality of Base transceiver stations (BTSs) 206-1 to 206-k and 208-1 to 208-k, MSs 220 and 222, and Home Location Register (HLR)/Visitor Location Register (VLR) 210.

Each of the MSCs 202-1 to 202-n is connected to the plural BSCs 204-1 to 204-m, and each of the BSCs 204-1 to 204-m is connected to the plural BTS 206-1 to 206-k and 208-1 to 208-k.

Especially, the BTS 208-k located in the public/private common cell area 214 provides the public mobile communication service to the MS 224 located in the public/private common cell area 214.

Each of the MSCs 202-1 to 202-n controls the connection between the BSCs (for example, BSCs 204-1 to 204-m) connected thereto and the PSTN/ISDN 216 or another MSC in the public mobile communication network.

Each of the BSCs 204-1 to 204-m performs the radio link control and handoff function. The BTSs 206-1 to 206-k and 208-1 to 208-k function to establish radio communication channels with the MSs 220, 222 and 224 belonging to communication service areas (cells) for the BTSs, that is, cell areas thereof, and manage radio resources.

In the HLR/VLR 210, the HLR performs a subscriber location registration function and a database function for storing the information of each subscriber. Further, the VLR functions as a database for temporarily storing the information of an MS located in a cell area managed by a corresponding MSC of the MSCs 202-1 to 202-n. If the MS moves to a cell area managed by another MSC, corresponding information stored in the VLR is deleted.

In this case, a communication service area for the BTSs 206-1 to 206-k and 208-1 to 208-k of the public mobile communication system is designated as a public cell area 215 to differentiate the communication service area from the public/private common cell area 214.

Generally, the public cell area 215 is much wider than the public/private common cell area 214 determined to be suitable to provide the convenient communication service to a specific group. Meanwhile, the MS 224 located in the public/private common cell area 214 establishes a radio communication channel with not only the BTS 208-k of the public network but also the pBTS 209 of the private network.

That is, in the case where the MS 224 moves from a public-only cell area of the public cell area 215 (in this case, an area to which the private mobile communication service is not provided is designated as the public-only cell area) to the public/private common cell area 214, a handoff operation from the BTSs 208-1 to 208-k-1 of the public-only cell area to the BTS 208-k managing the public/private common cell area 214 is performed. Additionally, a radio communication channel with the pBTS 209 located in the public/private common cell area 214 is established.

Such an overlapped establishment of radio communication channels is possible because the BTS 208-k and the pBTS 209 use different frequencies. While monitoring the frequency used by the pBTS 209, the MS 224 establishes overlapped radio communication channels by establishing the radio communication channel with the pBTS 209, if power measured at a frequency used by the pBTS 209 is equal to or greater than a minimum threshold value, if a round-trip distance (RTD): radius of a cell) between the MS 224 and the pBTS 209 is equal to or less than a maximum radius, or if a forward power gain is equal to or greater than a minimum threshold value.

Further, if a user of the MS 224 enters a desired called party's phone number (a phone number of a wired telephone, an extension number, a phone number of a mobile communication terminal, etc.), the MS 224 establishing the overlapped radio communication channels determines whether an identifier (for example, #, *, etc.) indicating a request for the connection to the pBTS 209 is added to the entered phone number. At this time, if the identifier is added to the phone number, the MS 224 sends a call request signal including the phone number to the pBTS 209 to establish a traffic channel, thus enabling communication between the user and the called party using the private mobile communication service.

If the identifier is not added to the phone number entered by the user, the MS 224 determines that the user desires a connection to the BTS 208-k, and then sends a call request signal including the phone number to the BTS 208-k to establish a traffic channel, thus enabling communication using the public mobile communication service.

For example, if the user enters a phone number "#212", the MS 224 determines that the user desires to use the private mobile communication service, because an identifier "#" indicating a request for the use of the private mobile communication service is added to the phone number. Therefore, the MS 224 sends a call request signal including the phone number "212" to the pBTS 209, thus enabling the user to communicate with an extension telephone subscriber using an extension number "212" through the pBTS 209.

Further, if the user enters a phone number "#02-212-8866", the MS 224 determines that the user desires to use the private mobile communication service, because the identifier "#" indicating a request for the use of the private mobile communication service is added to the phone number. Therefore, the MS 224 sends a call request signal including the phone number "02-212-8866" to the pBTS 209, thus enabling the user to communicate with a PSTN subscriber using the phone number "02-212-8866" over the PSTN through the pBTS 209.

Further, if the user enters a phone number "#016-212-8866", the MS 224 determines that the user desires to use the private mobile communication service, because the identifier "#" indicating a request for the use of the private mobile communication service is added to the phone number. Therefore, the MS 224 sends a call request signal including the phone number "016-212-8866" to the pBTS 209, thus enabling the user to communicate with a public mobile communication service subscriber using the phone number "016-212-8866" over the public mobile communication network via the pBTS 209 and the PSTN.

On the contrary, if the user enters a phone number "02-212-8866" having no identifier "#" indicating a request for the use of the private mobile communication service, the MS 224 determines that the user does not desire to use the private mobile communication service, because the identifier "#" is not added to the phone number. Therefore, the MS 224 sends a call request signal including the phone number "02-212-8866" to the BTS 208-k, thus enabling the user to communicate with a PSTN subscriber using the phone number "02-212-8866" over the PSTN via the BTS 208-k and the public mobile communication network.

Figure 3:
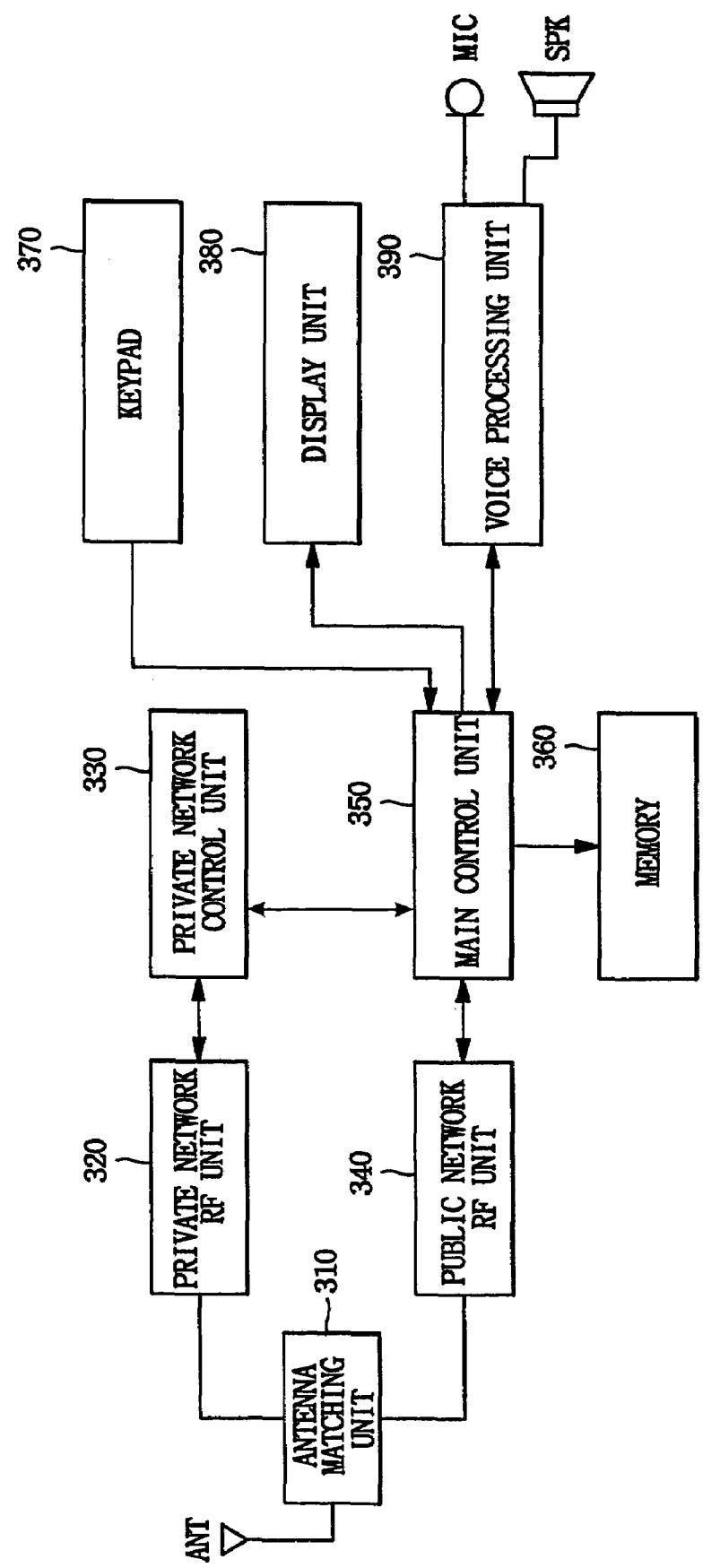
FIG. 3 is a block diagram of an MS of FIG. 2.

FIG. 3 is a block diagram of a MS of FIG. 2. Referring to FIG. 3, the MS includes a private network mobile phone unit 320 and 330, a public network mobile phone unit 340, a common unit 310, 360, 370, 380 and 390 commonly used, and a main control unit 350 for controlling an entire operation of the respective units.

The MS includes a private network control unit 330 for performing communication with a pBTS using a private mobile communication service-only frequency channel by controlling a private network Radio Frequency (RF) unit 320 when the MS is operated as a private network mobile phone.

In this case, the private network RF unit 320 includes a transmission/reception separating unit, a receiving unit, a transmitting unit, a frequency synthesizing unit and a signal processing unit, which are not shown.

The frequency synthesizing unit generates frequencies used to designate transmission and reception channels of the transmitting and receiving units under the control of the private network control unit 330.

Further, the transmission/reception separating unit serves to separate RF signals to be transmitted and received RF signals, and send the separated RF signals to an antenna, an antenna matching unit 310 and the receiving unit.

The receiving unit filters and low-noise amplifies the RF signals separated from the transmission/reception separating unit to convert the frequencies of the RF signals, and outputs the frequency-converted RF signals to the signal processing unit. The transmitting unit converts the frequencies of signals input from the signal processing unit and outputs the frequency-converted signals to the transmission/reception separating unit in RF signal format.

Further, the signal processing unit operates under the control of the private network control unit 330, demodulates digital signals input through the receiving unit, converts the demodulated signals to analog voice signals, and outputs the analog voice signals through a speaker. Further, the signal processing unit converts input analog voice signals to digital signals, modulates the digital signals, and outputs the modulated digital signals to the transmitting unit.

Further, the signal processing unit is provided with a tone generator, which generates a tone through a buzzer under the control of the private network control unit 330.

Such a private network mobile phone unit 330 is driven under the control of the main control unit 350. The private network control unit 330 transmits/receives voice call and data-related signals to/from the main control unit 350 when the MS is operated as a private network mobile phone. Further, the private network control unit 330 is connected to memory 360, keypad 370, display unit 380, voice processing unit 390, microphone MIC and speaker SPK, which are included in the common unit, through the main control unit 350.

Further, the public network mobile phone unit includes the public network RF unit 340 for performing communication with the public BTS using a public mobile communication service-only frequency channel when the MS is operated as a public network mobile phone, and the main control unit 350 for controlling the public network RF unit 340 and an entire operation of the mobile phone.

The public network RF unit 340 executes signal processing, such as filtering, with respect to RF signals input through the antenna, and then outputs the processed signals to a demodulating unit (not shown). The demodulating unit demodulates input high frequency signals to original signals, and outputs the original signals to the main control unit 350.

The antenna matching unit 310 receives RF signals in different frequency bands of private and public mobile communication services-only channels, respectively, through the antenna ANT, separates the RF signals, and matches the separated RF signals with corresponding RF units. Further, even in the case of transmission, the antenna matching unit 310 transmits RF signals from corresponding RF units through the antenna ANT.

The keypad 370, as the common unit, is comprised of various numeric keys for dialing and various function keys, and outputs corresponding key data to the main control unit 350 by an external manipulation, in most cases, a user's manipulation.

The display unit 380 receives various display data from the main control unit 350 and displays corresponding contents. The memory 360 is comprised of a Read Only Memory (ROM) for storing programs necessary for the operation of the mobile station, and a Random Access Memory (RAM) for temporarily storing data generated during the run of programs.

The voice processing unit 390 is connected to both the microphone MIC and the speaker SPK to process voices signals input/output through the microphone MIC and the speaker SPK.

As described above, the mobile station comprised of the private network mobile phone unit and the public network mobile phone unit is operated as a private/public network mobile phone in the case where the mobile station is located in the public/private common cell area.

That is, if the MS moves from the public-only cell area to the public/private common cell area, it is determined whether the MS is located in a private mobile communication service area while the MS continues to operate as the public network mobile phone. This determination is performed by determining whether power measured at a frequency used by the pBTS is equal to or greater than a minimum threshold value, whether a round-trip distance (RTD: radius of a cell) between the MS and the pBTS is equal to or less than a maximum radius, or whether a forward power gain is equal to or greater than a minimum threshold value. Therefore, if it is determined that the MS is located in the private mobile communication service area, the MS establishes a radio communication channel with the pBTS using the private mobile communication service-only frequency channel.

Further, if a desired called party's phone number is entered by the user while the MS is operated as the private and public network mobile phone, the MS determines whether the identifier (for example, #, *, etc.) indicating a request for the use of the private mobile communication service is added to the phone number. If the identifier is added to the phone number, the MS establishes a traffic channel with pBTS using the private network mobile phone, thus providing the private mobile communication service to the user. On the contrary, if the identifier is not added to the phone number, the MS establishes a traffic channel with the public BTS using the public network mobile phone, thus providing the public mobile communication service to the user.

In this embodiment, an integration-type MS in which the private network mobile phone unit and the public network mobile phone unit share one antenna to execute signal processing is described to be used as the MS (in this case, since frequencies used by the private and public network mobile phone units are adjacent to each other, signal processing can be executed by one antenna). However, alternatively, there can be used in the present invention a hybrid-type MS in which separate antennas are provided to allow the private network mobile phone unit and the public network mobile phone unit to use signals in different frequency bands.

Figure 4:
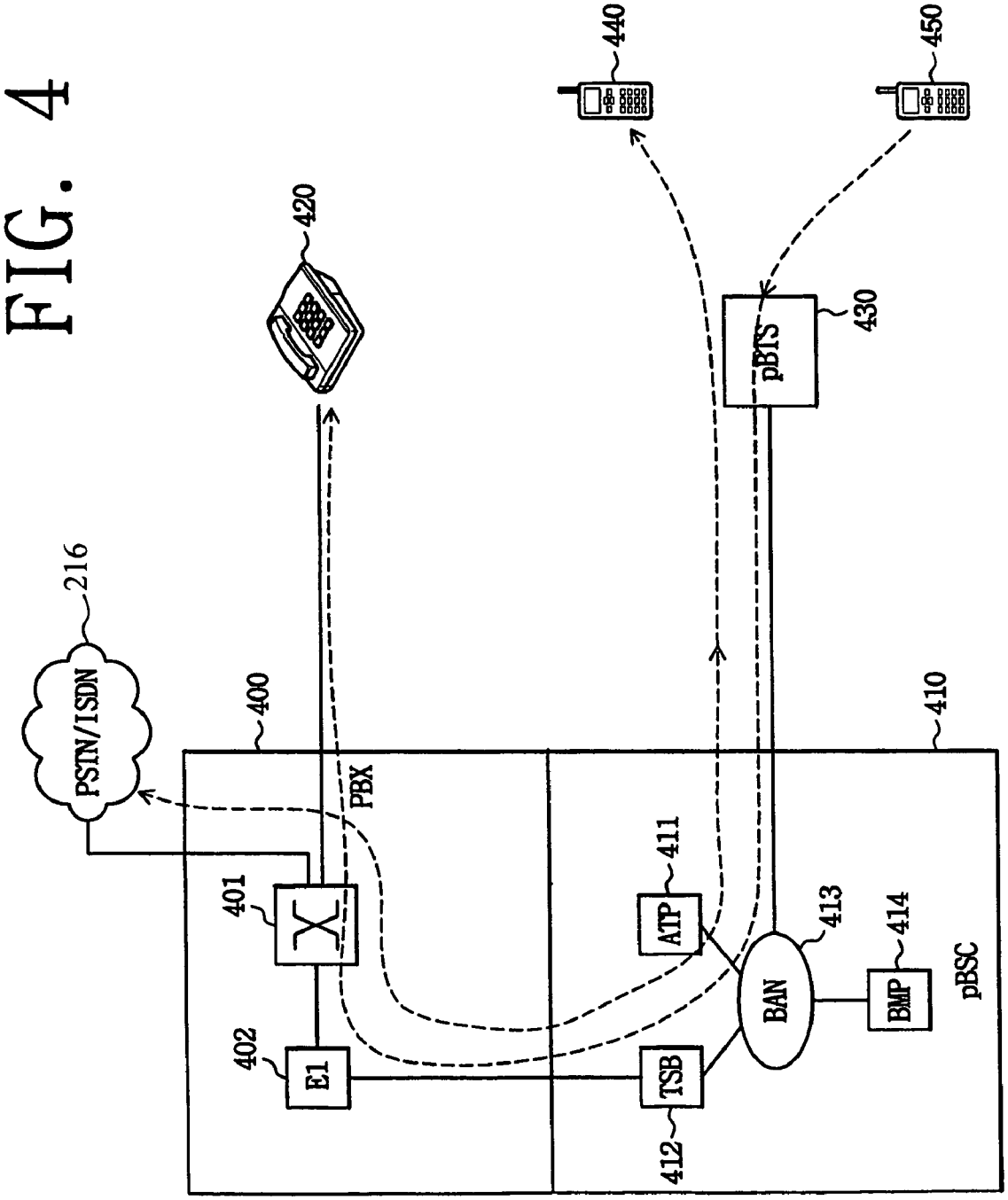
FIG. 4 is a view showing the construction of a private communication service apparatus of FIG. 2.

FIG. 4 is a view showing the construction of the private communication service apparatus 212 of FIG. 2, and especially showing communication channels when the private mobile communication service is provided according to an embodiment of the present invention.

Referring to FIG. 4, the private communication service apparatus of FIG. 2 includes a private branch exchange (PBX) 400 and a private BSC (pBSC) 410.

The PBX 400 includes a switch 401 and an E1 interface 402. The pBSC 410 includes an Air Termination Processor (ATP) 411, a Transcoder & Selector Bank (TSB) 412, a BSC Asynchronous transfer mode switch Network (BAN) 413 and a BSC Main Processor (BMP) 414.

It should be noted that the internal construction of the PBX 400 and the pBSC 410 of FIG. 4 is shown using only components required to describe communication channels when the private mobile communication service is provided. It is assumed that the MSs 440 and 450 of FIG. 4 are located in the public/private common cell area 214 and registered in the private communication service apparatus 212 to be capable of being provided with the private mobile communication service.

Under the above-described assumption, the following communication channels (traffic channels) are examples of the communication channels formed when the private mobile communication service is provided: a communication channel extending from the MS 450 to the PSTN/ISDN 216 or an extension telephone 420 connected to the PBX 400 through the pBTS 430, the BAN 413 of the pBSC 410, the TSB 412, and the E1 interface 402 and switch 401 of the PBX 400; and a communication channel extending from the PSTN/ISDN 216 or the extension telephone 420 to the MS 440 through the TSB 412, the BAN 413 and the pBTS 430. The formation of such communication channels for the private mobile communication service is performed under the control of the BMP 414 which is the main control unit of the private communication service apparatus 212.

The private communication service apparatus 212, according to the embodiment of the present invention, provides a wired communication service and the private mobile communication service. The wired communication service is provided by the PBX 400, and the private mobile communication service, that is, a wireless call service, is provided by both the PBX 400 and the pBSC 410 of FIG. 4.

As shown in FIG. 4, the pBSC 410 performs functions corresponding to the BSC of the public mobile communication service system, that is, a radio link control and handoff function, according to the embodiment of the present invention.

The BMP 414 of the pBSC 410 is a main control module of the pBSC 410, which performs several functions, including call processing and No. 7 (SS7) signal processing of the pBSC 410, the management of resources within the pBSC 410, and ATM link control. Further, for these functions, the BMP 414 supports the registration of private mobile communication service subscribers, and performs a Visitor Location Register (VLR) management function for roaming the MSs 440 and 450 registered in the private mobile communication network.

The BAN 413 of the pBSC 410 provides communication channels with the pBTS 430 and the PBX400, respectively, and data channels between the respective modules within the pBSC 410. That is, the BAN 413 serves to analyze a message type, and source and destination addresses included in a received message, and transmit the analyzed results to a corresponding device or processor.

The TSB 412 connected to the BAN 413 of the pBSC 410 is implemented to provide a wireless service to private mobile communication subscribers. The TSB 412 converts voice compression signals received from the MSs 440 and 450 through the pBTS 430 to 64k Pulse Code Modulation (PCM) data using a digital signal processor and transmits the PCM data to the PBX 400 through the E1/T1 link, or performs the functions opposite thereto. Therefore, the TSB 412 functions to interface communication data between the PBX 400 and the pBSC 410 and between the pBSC 410 and the pBTS 430.

Figure 5:
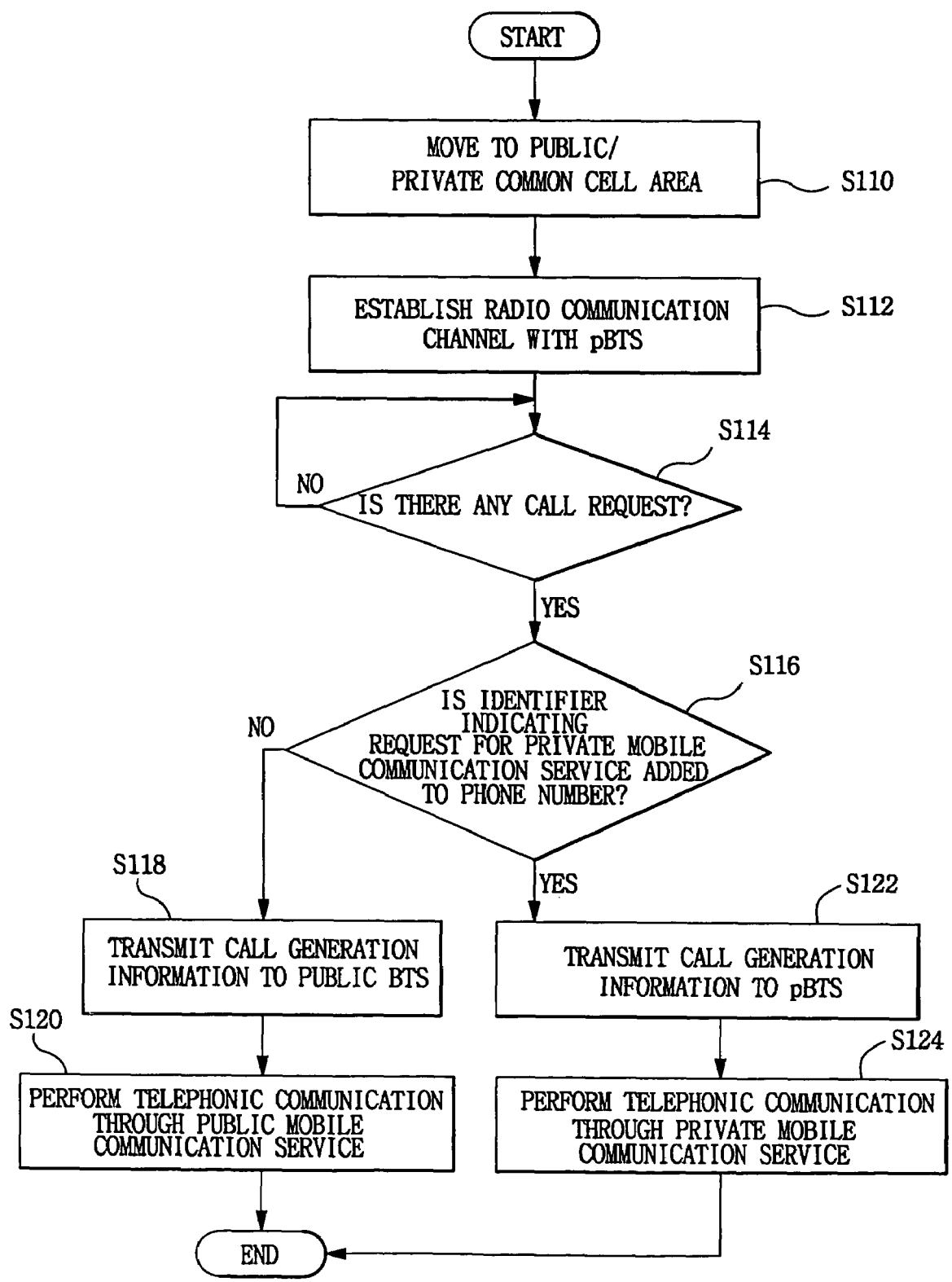
FIG. 5 is a flowchart of a method of processing a call from an MS according to an embodiment of the present invention.

FIG. 5 is a flowchart of a method of processing a call from an MS according to an embodiment of the present invention.

Referring to FIG. 5, if the MS moves from the public-only cell area 215 to the public/private common cell area 214 at step S110, the MS establishes a radio communication channel with the pBTS 209 at step S112.

Thereafter, the MS determines whether there is a call request as a user enters a phone number at step S114. If there is a call request, the MS determines whether an identifier indicating a request for the use of the private mobile communication service is added to the phone number at step S116.

If the identifier requiring the use of the private mobile communication service is not added to the phone number, the MS transmits call generation information to the public BTS 208-k at step S118 and establishes a traffic channel with the public BTS 208-k to perform telephonic communication through the public mobile communication service at step S120.

Further, if the identifier is added to the phone number, the MS transmits call generation information to the pBTS 209 to establish a traffic channel with the pBTS 209 at step S122, and performs telephonic communication through the private mobile communication service at step S124.

In this case, the flow of a call originating from the MS is described below: a) The MS senses a call originating from a user, and sends an origination message to the pBTS or public BTS using an access channel; b) The pBTS or public BTS establishes a traffic channel, and transmits null data to the MS; c) The pBTS or public BTS sends a channel assignment message to the MS using a paging channel; d) The MS confirms the establishment of the traffic channel and detects two consecutive valid frames by which the MS sends a traffic channel preamble to the pBTS or public BTS; e) The pBTS or public BTS acquires a reverse traffic channel, and sends a base station acknowledgement message to the MS; f) The MS transmits null data to the pBTS or public BTS; g) The pBTS or public BTS sends a service option response message to the MS; and h) Voice frames are transmitted between the MS and the pBTS or public BTS.

Further, the traffic channel control of the MS is comprised of: a) a traffic channel initialization sub-state in which the MS verifies whether it can receive packets through a forward traffic channel, and begins transmission through a reverse traffic channel; b) a conversation sub-state in which the MS exchanges primary traffic packets with the pBTS or public BTS; and c) a release sub-state in which the MS terminates the call. FIG. 6 is a flowchart of a method of processing a call from one MS 450 to another MS 440 located in a public/private common cell area 214 according to an embodiment of the present invention.

Referring to FIG. 6, in the method of processing a call from one MS 450 to another MS 440 located in the public/private common cell area 214, the pBTS 209 having received a call signal from the MS 450 located in the public/private common cell area sends the call signal to the BAN 413 at step S210.

Thereafter, the BAN 413 sends the call signal to the BMP 414 at step S212, and requests a private Home Location Register (pHLR) provided in the BAN 414 to determine whether a called party's MS 440 is a subscriber to the private mobile communication service and it is located in the public/private common cell area 214 at the present time and registered to establish a radio communication channel at step S214, and receives the determined results from the pHLR at step S216.

If the called party's MS 440 is not a subscriber to the private mobile communication service depending on the determined results, the BMP 414 switches the call signal to the PSTN through the switch 401 of the PBX 400 at step S220, and allows a traffic channel with the called party's MS 440 to be established over the PSTN 216 and the public mobile communication network at step S222, thus enabling telephonic communication between the MSs 440 and 450 at step S224.

On the other hand, if the called party's MS 440 is a subscriber to the private mobile communication service, and it is located in the public/private common cell area 214 at the present time, registered to establish a radio communication channel, and is not busy, the BMP 414 switches the call signal to the pBTS 430 through the switch 401 of the PBX 400 at step S226.

Thereafter, the pBTS 430 establishes a traffic channel with the called party's MS 440 at step S228, thus enabling telephonic communication between the MSs 440 and 450 at step S230.

As described above, the present invention provides a system for providing a private mobile communication service separately from a public mobile communication network and method of processing a call using the same, which can provide a wireless local network function without being subordinate to a conventional public mobile communication service system.

Further, the present invention is advantageous in that it can provide a wireless local network function without being influenced by a wireless environment of a conventional public mobile communication service system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for providing a private mobile communication service, comprising:
   a public base transceiver station disposed within a public/private common cell area and providing a public mobile communication service;
   a private base transceiver station disposed within said public/private common cell area and providing a private mobile communication service; and
   a first mobile station establishing a radio communication channel with both the public base transceiver station and the private base transceiver station, when the first mobile station moves from a public-only cell area to said public/private common cell area, said first mobile station determining whether an identifier indicating a request for the private mobile communication service is added to a dialed phone number entered by a user, establishing a traffic channel with the private base transceiver station when it is determined that the identifier is added to the dialed phone number, and establishing a traffic channel with the public base transceiver station when it is determined that the identifier is not added to the dialed phone number, wherein the first mobile station sends a signal indicating that the first mobile station is busy to the public base transceiver station when a traffic channel request signal is received through the public base transceiver station while the first mobile station is provided with the private mobile communication service through the private base transceiver station.

2. The system as set forth in claim 1, further comprising:
   a private communication service apparatus verifying whether the first mobile station is a subscriber to the private mobile communication service, when a request for establishing a radio communication channel is received by the private base transceiver station from the first mobile station, establishing a radio communication channel, to enable telephonic communication, with the private base transceiver station when it is verified that the first mobile station is a subscriber to the private mobile communication service, and establishing a traffic channel over a network to a called party corresponding to the dialed phone number, if a traffic channel request is received from the first mobile station with which the radio communication channel is established.

3. The system as set forth in claim 2, said network being a public mobile communication network through a public switched telephone network when said called party corresponds to a second mobile station located in the public-only cell area.

4. The system as set forth in claim 2, said network being a wired network when said called party corresponds to an extension phone connected to a private branch exchange within said private communication service apparatus.

5. The system as set forth in claim 2, said network being a public mobile communication network accessed by way of a Public Switched Telephone Network (PSTN)/Integrated Services Digital Network (ISDN), when said called party corresponds to a mobile station not registered as belonging to the public/private common cell area.

6. The system as set forth in claim 2, said network being a private wireless network by way of said private base transceiver station, when said called party corresponds to a second mobile station disposed within said public/private common cell area and registered as belonging to said public/private common cell area.

7. The system as set forth in claim 2, the private communication service apparatus comprising:
   a private branch exchange establishing a traffic channel with a local extension telephone through a wired local network, when a request for establishing a traffic channel with the local extension telephone is received from the first mobile station;
   the private branch exchange establishing a traffic channel with a general telephone through a public switched telephone network, when a request for establishing a traffic channel with a general telephone is received from the first mobile station;
   the private branch exchange establishing a traffic channel over a private mobile communication network, when a request for establishing a traffic channel with a mobile station of another service subscriber located in the public/private common cell area is received from the first mobile station;
   a private base station controller verifying whether the first mobile station is a subscriber to the private mobile communication service, when the first mobile station requests the private base station controller to establish a radio communication channel through the private base transceiver station; and
   the private base station controller establishing a radio communication channel, when the first mobile station is verified to be a subscriber to the private mobile communication service;
   the private base station controller transmitting traffic channel request signals received through the private base transceiver station to the private branch exchange; and
   the private base station controller establishing a traffic channel with a mobile terminal of another service subscriber through the private base transceiver station in response to a request for establishment of a traffic channel with the mobile terminal of the service subscriber, the request being received from the private branch exchange.

8. The system as set forth in claim 1, wherein the identifier indicating a request for the private mobile communication service is a character # or a character *.

9. The system as set forth in claim 1, said first mobile station comprising:
   a private network control unit for performing communication with said private base transceiver station using a private mobile communication service-only frequency channel by controlling a private network Radio Frequency (RF) unit, when the first mobile station is operated as a private network mobile phone when it is determined that the identifier is added to the dialed phone number; and
   a public network mobile phone unit utilizing a main control unit for performing communication with said public base transceiver station using a public mobile communication service-only frequency channel by controlling a public network Radio Frequency (RF) unit, when the first mobile station is operated as a public network mobile phone when it is determined that the identifier is not added to the dialed phone number.

10. The system as set forth in claim 9, said first mobile station further comprising an antenna matching unit that receives RF signals in different frequency bands of private and public mobile communication services-only channels, respectively, through an antenna, separates the RF signals, and matches the separated RF signals with the corresponding private or public network Radio Frequency (RF) units, and transmits RF signals from the private or public network Radio Frequency (RF) units through the antenna.

11. A method of processing a call using a private mobile communication service system, comprising steps of:

when a mobile station moves from a public-only cell area to a public/private common cell area, establishing a radio communication channel between said mobile station and a public base transceiver station disposed within said public/private common cell area and providing a public mobile communication service, while also establishing another radio communication channel between said mobile station and a private base transceiver station disposed within said public/private common cell area and providing a private mobile communication service;

determining if there is a call request, indicative of a call to a called party, by detecting a dialed phone number input by said mobile station;

checking for an identifier, indicating a request for said private mobile communication service, added to said phone number;

establishing a traffic channel between said mobile station and said public base transceiver station to receive the public mobile communication service, when the identifier is not added to the phone number;

establishing a traffic channel between said mobile station and said private mobile communication service system to receive the private mobile communication service, when the identifier is added to the phone number; and sending a signal indicating that the mobile station is busy to the public base transceiver station when a traffic channel request signal is received through the public base transceiver station while the first mobile station is provided with the private mobile communication service through the private base transceiver station.

12. The method according to claim 11, wherein the identifier indicating a request for the private mobile communication service is a character # or a character *.

13. The method as set forth in claim 11, further comprising steps of:

verifying whether the mobile station is a subscriber to the private mobile communication service, when a request for establishing a radio communication channel is received by the private base transceiver station from the mobile station;

establishing a radio communication channel, to enable telephonic communication, between a private communication service apparatus and the mobile station when it is verified that the first mobile station is a subscriber to the private mobile communication service; and establishing a traffic channel over a network to the called party corresponding to the dialed phone number, if a traffic channel request is received from the mobile station with which the radio communication channel is established.

14. The method according to claim 13, the step of establishing a traffic channel over a network to a called party comprising steps of:

determining, when the called party is a called mobile terminal, whether the called mobile terminal is registered in said private communication service apparatus as a subscriber of said private mobile communication service;

switching the call to said private base transceiver station through a switch of a private branch exchange, when it is determined that the called mobile terminal is registered in said private communication service apparatus as a subscriber of said private mobile communication service, to enable telephonic communication between the mobile station and the called mobile terminal over a private wireless network; and switching the call to a public switched telephone network through the switch of the private branch exchange, when it is determined that the called mobile terminal is not registered in said private communication service apparatus as a subscriber of said private mobile communication service and establishing a traffic channel over the public switched telephone network and a public mobile communication network to enable telephonic communication between the mobile station and the called mobile terminal.

* * * * *